(12) United States Patent
Avery et al.

(10) Patent No.: US 11,704,592 B2
(45) Date of Patent: Jul. 18, 2023

(54) MACHINE-LEARNING BASED GESTURE RECOGNITION

(71) Applicant: Apple Inc., Cupertino, CA (US)

(72) Inventors: Keith P. Avery, Seattle, WA (US); Jamil Dhanani, San Francisco, CA (US); Harveen Kaur, Santa Clara, CA (US); Varun Maudgalya, Sunnyvale, CA (US); Timothy S. Paek, Mercer Island, WA (US); Dmytro Rudchenko, Bellevue, WA (US); Brandt M. Westing, Seattle, WA (US); Minwoo Jeong, Sammamish, WA (US)

(73) Assignee: Apple Inc., Cupertino, CA (US)

(*) Notice: Subject to any disclaimer, the term of this patent is extended or adjusted under 35 U.S.C. 154(b) by 176 days.

(21) Appl. No.: 16/937,479

(22) Filed: Jul. 23, 2020

(65) Prior Publication Data

US 2021/0027199 A1    Jan. 28, 2021

Related U.S. Application Data

(60) Provisional application No. 62/878,695, filed on Jul. 25, 2019.

(51) Int. Cl.
| | | |
|---|---|---|
| G06F 3/0488 | (2022.01) | |
| G06F 3/01 | (2006.01) | |
| G06F 3/0481 | (2022.01) | |
| G06N 20/00 | (2019.01) | |
| G06F 3/04883 | (2022.01) | |

(Continued)

(52) U.S. Cl.
CPC ............ *G06N 20/00* (2019.01); *G06F 3/011* (2013.01); *G06F 3/017* (2013.01); *G06F 3/04883* (2013.01); *H04R 3/04* (2013.01); *G06N 3/08* (2013.01); *H04R 2430/01* (2013.01)

(58) Field of Classification Search
None
See application file for complete search history.

(56) References Cited

U.S. PATENT DOCUMENTS

| | | | | |
|---|---|---|---|---|
| 9,405,377 B2* | 8/2016 | Li | ........................... | G01H 17/00 |
| 10,535,005 B1* | 1/2020 | Badr | ..................... | G06N 3/0445 |
| 10,652,706 B1* | 5/2020 | Sharifi | ..................... | H04W 4/18 |

(Continued)

OTHER PUBLICATIONS

International Search Report and Written Opinion from PCT/US2020/043331, dated Dec. 22, 2020, 15 pages.

*Primary Examiner* — Jordany Nunez
(74) *Attorney, Agent, or Firm* — BakerHostetler

(57) ABSTRACT

The subject technology receives, from a first sensor of a device, first sensor output of a first type. The subject technology receives, from a second sensor of the device, second sensor output of a second type, the first and second sensors being non-touch sensors. The subject technology provides the first sensor output and the second sensor output as inputs to a machine learning model, the machine learning model having been trained to output a predicted touch-based gesture based on sensor output of the first type and sensor output of the second type. The subject technology provides a predicted touch-based gesture based on output from the machine learning model. Further, the subject technology adjusts an audio output level of the device based on the predicted gesture, and where the device is an audio output device.

20 Claims, 6 Drawing Sheets

(51) Int. Cl.
*H04R 3/04* (2006.01)
*G06N 3/08* (2023.01)

(56) References Cited

U.S. PATENT DOCUMENTS

| | | |
|---|---|---|
| 10,803,408 B2 * | 10/2020 | Sharifi .................. H04W 12/06 |
| 11,270,565 B2 * | 3/2022 | Han .................... G08B 21/0446 |
| 2009/0265671 A1 | 10/2009 | Sachs et al. |
| 2013/0077820 A1 | 3/2013 | Marais et al. |
| 2015/0261298 A1 * | 9/2015 | Li ........................... G06F 3/017 |
| | | 345/156 |
| 2016/0075016 A1 * | 3/2016 | Laurent .................. G05B 15/02 |
| | | 700/47 |
| 2016/0075034 A1 * | 3/2016 | Laurent .................. G05B 15/02 |
| | | 700/264 |
| 2016/0091308 A1 | 3/2016 | Oliaei |
| 2017/0359467 A1 | 12/2017 | Norris et al. |
| 2018/0307405 A1 * | 10/2018 | Dandekar ............ G06F 3/04883 |
| 2019/0025936 A1 * | 1/2019 | Flagg ...................... A63F 13/42 |
| 2019/0196600 A1 | 6/2019 | Rothberg et al. |

\* cited by examiner

MACHINE-LEARNING BASED GESTURE RECOGNITION

CROSS-REFERENCE TO RELATED APPLICATIONS

The present application claims the benefit of U.S. Provisional Patent Application Ser. No. 62/878,695, entitled "Machine-Learning Based Gesture Recognition," filed on Jul. 25, 2019, which is hereby incorporated by reference in its entirety for all purposes.

TECHNICAL FIELD

The present description relates generally to gesture recognition, including machine-learning based gesture recognition.

BACKGROUND

The present disclosure relates generally to electronic devices and in particular to detecting gestures made by a user wearing or otherwise operating an electronic device. Wearable technology is attracting considerable interest, including audio accessory devices (e.g., earbuds), where a user can potentially enjoy the benefits of mobile technology with increased convenience.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Wearable devices, such as earphones/headphones/headset and/or one or more earbuds, can be configured to include various sensors. For example, an earbud can be equipped with various sensors, such as an optical sensor (e.g., photoplethysmogram (PPG) sensor), a motion sensor, a proximity sensor, and/or a temperature sensor, that can work independently and/or in concert to perform one or more tasks, such as detecting when an earbud is placed inside a user's ear, detecting when an earbud is placed inside a case, etc. An earbud and/or earphones that includes one or more of the aforementioned sensors may also include one or more additional sensors, such as a microphone or array of microphones. However, an earbud and/or earphones may not include a touch sensor for detecting touch inputs and/or touch gestures, in view of size/space constraints, power constraints, and/or manufacturing costs.

Nonetheless, it may be desirable to allow devices that do not include touch sensors, such as earbuds, to detect touch input and/or touch gestures from users. The subject technology enables a device that does not include a touch sensor to detect touch input and/or touch gestures from users by utilizing inputs received via one or more non-touch sensors included in the device. For example, inputs received from one or more non-touch sensors may be applied to a machine learning model to detect whether the inputs correspond to a touch input and/or gesture. In this manner, the subject technology can enable detection of touch inputs and/or touch gestures on a surface of a device, such as taps, swipes, and the like, without the use of a touch sensor.

Figure 1:
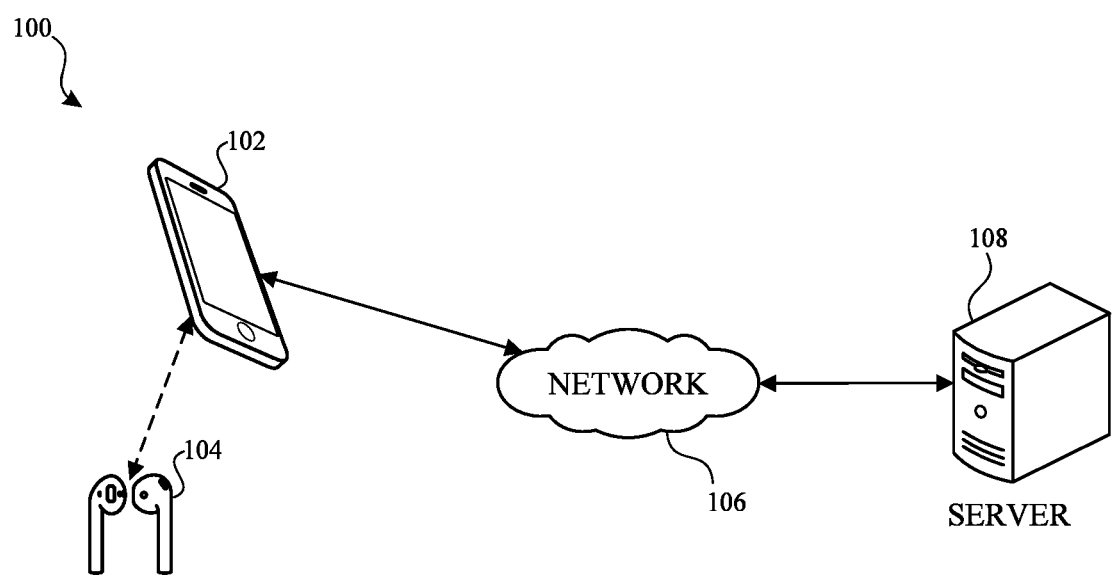
FIG. 1 illustrates an example network environment for providing machine-learning based gesture recognition in accordance with one or more implementations.

FIG. 1 illustrates an example network environment for providing machine-learning based gesture recognition in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, a wireless audio output device 104, a network 106, and a server 108. The network 106 may communicatively (directly or indirectly) couple, for example, the electronic device 102 and/or the server 108. In FIG. 1, the wireless audio output device 104 is illustrated as not being directly coupled to the network 106; however, in one or more implementations, the wireless audio output device 104 may be directly coupled to the network 106.

The network 106 may be an interconnected network of devices that may include, or may be communicatively coupled to, the Internet. In one or more implementations, connections over the network 106 may be referred to as wide area network connections, while connections between the electronic device 102 and the wireless audio output device 104 may be referred to as peer-to-peer connections. For explanatory purposes, the network environment 100 is illustrated in FIG. 1 as including electronic devices 102-105 and a single server 108; however, the network environment 100 may include any number of electronic devices and any number of servers.

The server 108 may be, and/or may include all or part of the electronic system discussed below with respect to FIG. 6. The server 108 may include one or more servers, such as a cloud of servers. For explanatory purposes, a single server 108 is shown and discussed with respect to various operations. However, these and other operations discussed herein may be performed by one or more servers, and each different operation may be performed by the same or different servers.

The electronic device may be, for example, a portable computing device such as a laptop computer, a smartphone, a peripheral device (e.g., a digital camera, headphones), a tablet device, a smart speaker, a set-top box, a content streaming device, a wearable device such as a watch, a band, and the like, or any other appropriate device that includes one or more wireless interfaces, such as one or more near-field communication (NFC) radios, WLAN radios, Bluetooth radios, Zigbee radios, cellular radios, and/or other wireless radios. In FIG. 1, by way of example, the electronic device 102 is depicted as a smartphone. The electronic device 102 may be, and/or may include all or part of, the electronic device discussed below with respect to FIG. 2, and/or the electronic system discussed below with respect to FIG. 6.

The wireless audio output device 104 may be, for example, a wireless headset device, wireless headphones, one or more wireless earbuds, a smart speaker, or generally any device that includes audio output circuitry and one or more wireless interfaces, such as near-field communication (NFC) radios, WLAN radios, Bluetooth radios, Zigbee radios, and/or other wireless radios. In FIG. 1, by way of example, the wireless audio output device 104 is depicted as a set of wireless earbuds. As is discussed further below, the wireless audio output device 104 may include one or more sensors that can be used and/or repurposed to detect input received from a user; however, in one or more implementations, the wireless audio output device 104 may not include a touch sensor. As mentioned herein, a touch sensor can refer to a sensor that measures information arising directly from a physical interaction corresponding to a physical touch (e.g., when the touch sensor receives touch input from a user). Some examples of a touch sensor include a surface capacitive sensor, project capacitive sensor, wire resistive sensor, surface acoustic wave sensor, and the like. The wireless audio output device 104 may be, and/or may include all or part of, the wireless audio output device discussed below with respect to FIG. 2, and/or the electronic system discussed below with respect to FIG. 6.

The wireless audio output device 104 may be paired, such as via Bluetooth, with the electronic device 102. After the two devices 102, 104 are paired together, the devices 102, 104 may automatically form a secure peer-to-peer connection when located proximate to one another, such as within Bluetooth communication range of one another. The electronic device 102 may stream audio, such as music, phone calls, and the like, to the wireless audio output device 104.

For explanatory purposes, the subject technology is described herein with respect to a wireless audio output device 104. However, the subject technology can also be applied to wired devices that do not include touch sensors, such as wired audio output devices. Further for explanatory purposes, the subject technology is discussed with respect to devices that do not include touch sensors. However, in one or more implementations, the subject technology may be used in conjunction with a touch sensor, such as to enhance and/or improve the detection of touch input by the touch sensor. For example, a device may include a low-cost and/or low-power touch sensor that may coarsely detect touch inputs and/or touch gestures, and the coarsely detected touch inputs/gestures can be refined using the subject technology.

Figure 2:
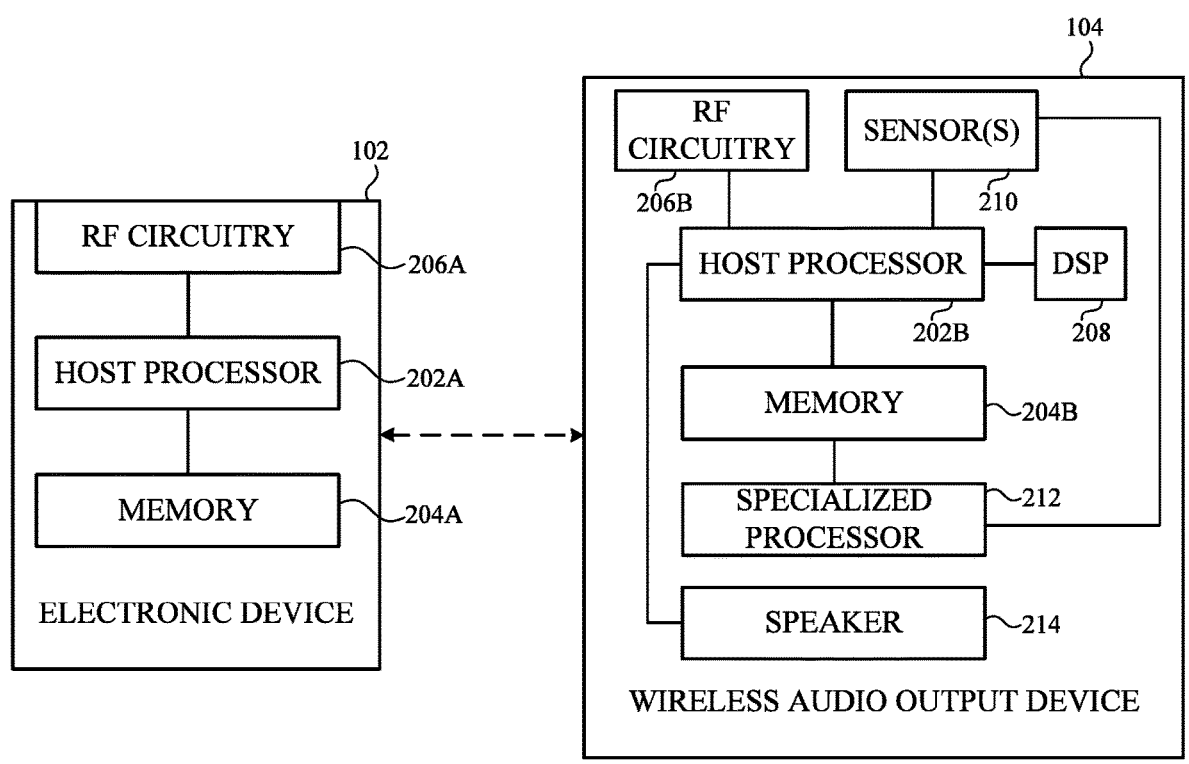
FIG. 2 illustrates an example network environment including an example electronic device and an example wireless audio output device in accordance with one or more implementations.

FIG. 2 illustrates an example network environment 200 including an example electronic device 102 and an example wireless audio output device 104 in accordance with one or more implementations. The electronic device 102 is depicted in FIG. 2 for explanatory purposes; however, one or more of the components of the electronic device 102 may also be implemented by other electronic device(s). Similarly, the wireless audio output device 104 is depicted in FIG. 2 for explanatory purposes; however, one or more of the components of the wireless audio output device 104 may also be implemented by other device(s). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202A, a memory 204A, and radio frequency (RF) circuitry 206A. The wireless audio output device 104 may include a host processor 202B, a memory 204A, RF circuitry 206B, a digital signal processor (DSP) 208, one or more sensor(s) 210, a specialized processor 212, and a speaker 214. In an implementation, the sensor(s) 210 may include one or more of a motion sensor such as an accelerometer, an optical sensor, and a sound sensor such as a microphone. It is appreciated that the aforementioned sensor do not include capacitive or resistive touch sensor hardware (or any of the aforementioned examples of touch sensors).

The RF circuitries 206A-B may include one or more antennas and one or more transceivers for transmitting/receiving RF communications, such as WiFi, Bluetooth, cellular, and the like. In one or more implementations, the RF circuitry 206A of the electronic device 102 may include circuitry for forming wide area network connections and peer-to-peer connections, such as WiFi, Bluetooth, and/or cellular circuitry, while the RF circuitry 206B of the wireless audio output device 104 may include Bluetooth, WiFi, and/or other circuitry for forming peer-to-peer connections.

In an implementation, the RF circuitry 206B can be used to receive audio content that can be processed by the host processor 202B and sent on to the speaker 214 and/or also receive signals from the RF circuitry 206A of the electronic device 102 for accomplishing tasks such as adjusting a volume output of the speaker 214 among other types of tasks.

The host processors 202A-B may include suitable logic, circuitry, and/or code that enable processing data and/or controlling operations of the electronic device 102 and the wireless audio output device 104, respectively. In this regard, the host processors 202A-B may be enabled to provide control signals to various other components of the electronic device 102 and the wireless audio output device 104, respectively. Additionally, the host processors 202A-B may enable implementation of an operating system or may otherwise execute code to manage operations of the electronic device 102 and the wireless audio output device 104, respectively. The memories 204A-B may include suitable logic, circuitry, and/or code that enable storage of various types of information such as received data, generated data, code, and/or configuration information. The memories 204A-B may include, for example, random access memory (RAM), read-only memory (ROM), flash, and/or magnetic storage. The DSP 208 of the wireless audio output device 104 may include suitable logic, circuitry, and/or code that enable particular processing.

As discussed herein, a given electronic device, such as the wireless audio output device 104, may include a specialized processor (e.g., the specialized processor 212) that may be always powered on and/or in an active mode, e.g., even when a host/application processor (e.g., the host processor 202B) of the device is in a low power mode or in an instance where such an electronic device does not include a host/application processor (e.g., a CPU and/or GPU). Such a specialized processor may be a low computing power processor that is engineered to also utilize less energy than the CPU or GPU, and also is designed, in an example, to be running continuously on the electronic device in order to collect audio and/or sensor data. In an example, such a specialized processor can be an Always On Processor (AOP), which is a small and low power auxiliary processor that is implemented as an embedded motion coprocessor. In one or more implementations, the DSP 208 may be, and/or may include all or part of, the specialized processor 212.

The specialized processor 212 may be implemented as specialized, custom, and/or dedicated hardware, such as a low-power processor that may be always powered on (e.g., to detect audio triggers, collect and process sensor data from sensors such as accelerometers, optical sensors, and the like) and continuously runs on the wireless audio output device 104. The specialized processor 212 may be utilized to perform certain operations in a more computationally and/or power efficient manner. In an example, to enable deployment of a neural network model on the specialized processor 212, which has less computing power than a main processor (e.g., the host processor 202B), modifications to the neural network model are performed during a compiling process for the neural network model in order to make it compatible with the architecture of the specialized processor 212. In an example, the specialized processor 212 may be utilized to execute operations from such a compiled neural network model, as discussed further in FIG. 3 below. In one or more implementations, the wireless audio output device 104 may only include the specialized processor 212 (e.g., exclusive of the host processor 202B and/or the DSP 208).

In one or more implementations, the electronic device 102 may pair with the wireless audio output device 104 in order to generate pairing information that can be used to form a connection, such as a peer-to-peer connection between the devices 102, 104. The pairing may include, for example, exchanging communication addresses, such as Bluetooth addresses. After pairing, the devices 102, 104 may store the generated and/or exchanged pairing information (e.g. communication addresses) in the respective memories 204A-B. In this manner, the devices 102, 104 may automatically, and without user input, connect to each other when in range of communication of the respective RF circuitries 206A-B using the respective pairing information.

The sensor(s) 210 may include one or more sensors for detecting device motion, user biometric information (e.g., heartrate), sound, light, wind, and/or generally any environmental input. For example, the sensor(s) 210 may include one or more of an accelerometer for detecting device acceleration, one or more microphones for detecting sound and/or an optical sensor for detecting light. As discussed further below with respect to FIGS. 3-5, the wireless audio output device 104 may be configured to output a predicted gesture based on output provided by one or more of the sensor(s) 210, e.g., corresponding to an input detected by the one or more of the sensor(s) 210.

In one or more implementations, one or more of the host processors 202A-B, the memories 204A-B, the RF circuitries 206A-B, the DSP 208, and/or the specialized processor 212, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
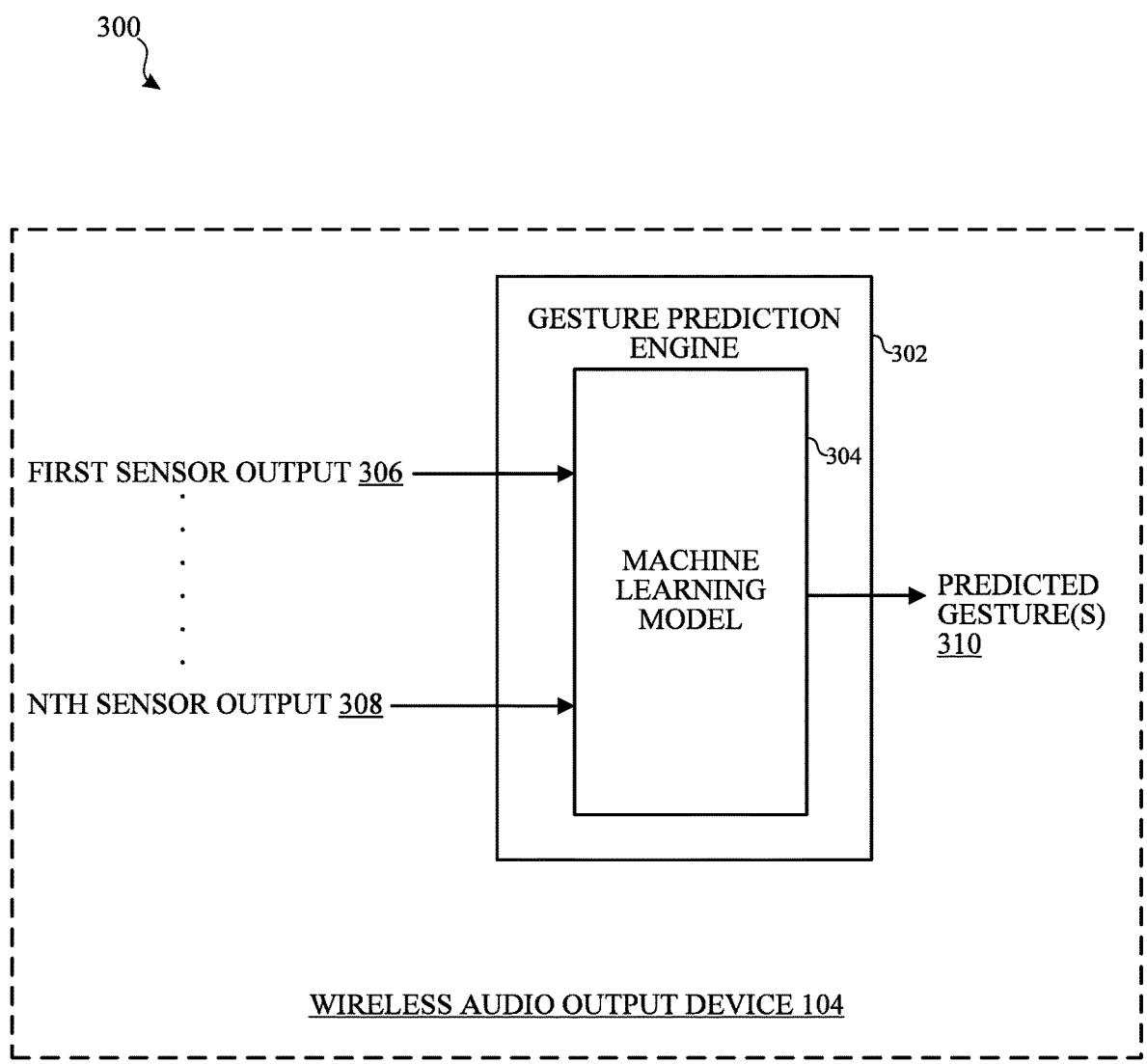
FIG. 3 illustrates an example architecture, that may be implemented by the wireless audio output device, for detecting a gesture, without using a touch sensor, based on other sensor output data in accordance with one or more implementations.

FIG. 3 illustrates an example architecture 300, that may be implemented by the wireless audio output device 104, for detecting a gesture, without using a touch sensor, based on other sensor output data in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the architecture 300 may provide for detecting gestures, without using information from a touch sensor, based on sensor outputs that are fed into a gesture prediction engine 302, which may be executed by the specialized processor 212. Examples of a specialized processor are discussed in more detail in U.S. Provisional Patent Application No. 62/855,840 entitled "Compiling Code For A Machine Learning Model For Execution On A Specialized Processor," filed on May 31, 2019, which is hereby incorporated by reference in its entirety for all purposes. As illustrated, the gesture prediction engine 302 includes a machine learning model 304. The machine learning model 304, in an example, is implemented as a convolutional neural network model that is configured to detect a gesture using such sensor inputs over time. Further, the machine learning model 304 may be been pre-trained on a different device (e.g., the electronic device 102 and/or the server 108) based on sensor output data prior to being deployed on the wireless audio output device 104.

As discussed herein, a neural network (NN) is a computing model that uses a collection of connected nodes to process input data based on machine learning techniques. Neural networks are referred to as networks because they may be represented by connecting together different operations. A model of a NN (e.g., feedforward neural network) may be represented as a graph representing how the operations are connected together from an input layer, through one or more hidden layers, and finally to an output layer, with each layer including one or more nodes, and where different layers perform different types of operations on respective input.

A convolutional neural network (CNN) as mentioned above is one type of neural network. As discussed herein, a CNN refers to a particular type of neural network, but uses different types of layers made up of nodes existing in three dimensions where the dimensions may change between layers. In a CNN, a node in a layer may only be connected to a subset of the nodes in a previous layer. The final output layer may be fully connected and be sized according to the number of classifiers. A CNN may include various combinations, and in some instances, multiples of each, and orders of the following types of layers: the input layer, convolutional layers, pooling layers, rectified linear unit layers (ReLU), and fully connected layers. Part of the operations performed by a convolutional neural network includes taking a set of filters (or kernels) that are iterated over input data based on one or more parameters.

In an example, convolutional layers read input data (e.g., a 3D input volume corresponding to sensor output data, a 2D representation of sensor output data, or a 1D representation of sensor output data), using a kernel that reads in small segments at a time and steps across the entire input field. Each read can result in an input that is projected onto a filter map and represents an internal interpretation of the input. A CNN such as the machine learning model 304, as discussed herein, can be applied to human activity recognition data (e.g., sensor data corresponding to motion or movement) where a CNN model learns to map a given window of signal data to an activity (e.g., gesture and/or portion of a gesture) where the model reads across each window of data and prepares an internal representation of the window.

As illustrated in FIG. 3, a set of sensor outputs from a first sensor output 306 to a Nth sensor output 308 from the aforementioned sensors described in FIG. 2 (e.g., the sensor(s) 210) may be provided as inputs to the machine learning model 304. In an implementation, each sensor output may correspond to a window of time e.g., 0.5 second in which the sensor data was collected by the respective sensor. In one or more implementations, the sensor outputs 306-308 may be filtered and/or pre-processed, e.g., normalized, before being provided as inputs to the machine learning model 304.

In an implementation, the first sensor output 306 to the Nth sensor output 308 includes data from the accelerometer, data from the optical sensor, and audio data from a microphone of the wireless audio output device 104. From the collected sensor data, the machine learning model (e.g., a CNN) can be trained. In a first example, the model is trained using data from the accelerometer and data from the optical sensor. In a second example, the model is trained using data from the accelerometer, data from the optical sensor, and audio data from a microphone.

In an example, the inputs detected by the optical sensor, accelerometer, and microphone may individually and/or collectively be indicative of a touch input. For example, a touch input/gesture along and/or on a body/housing of the wireless audio output device 104, such as swiping up or swiping down, tapping, etc., may cause a particular change to the light detected by an optical sensor that is disposed on and/or along the body/housing. Similarly, such a touch input/gesture may result in a particular sound that can be detected by a microphone, and/or may cause a particular vibration that can be detected by an accelerometer. Furthermore, if the wireless audio output device 104 includes multiple microphones disposed at different locations, the sound detected at each microphone may vary based on the location along the body/housing where the touch input/gesture was received.

After training, the machine learning model 304 generates a set of output predictions corresponding to predicted gesture(s) 310. After the predictions are generated, a policy may be applied to the predictions to determine whether to indicate an action for the wireless audio output device 104 to perform, which is discussed in more detail in the description of FIGS. 4A-4B below.

Figure 4A:
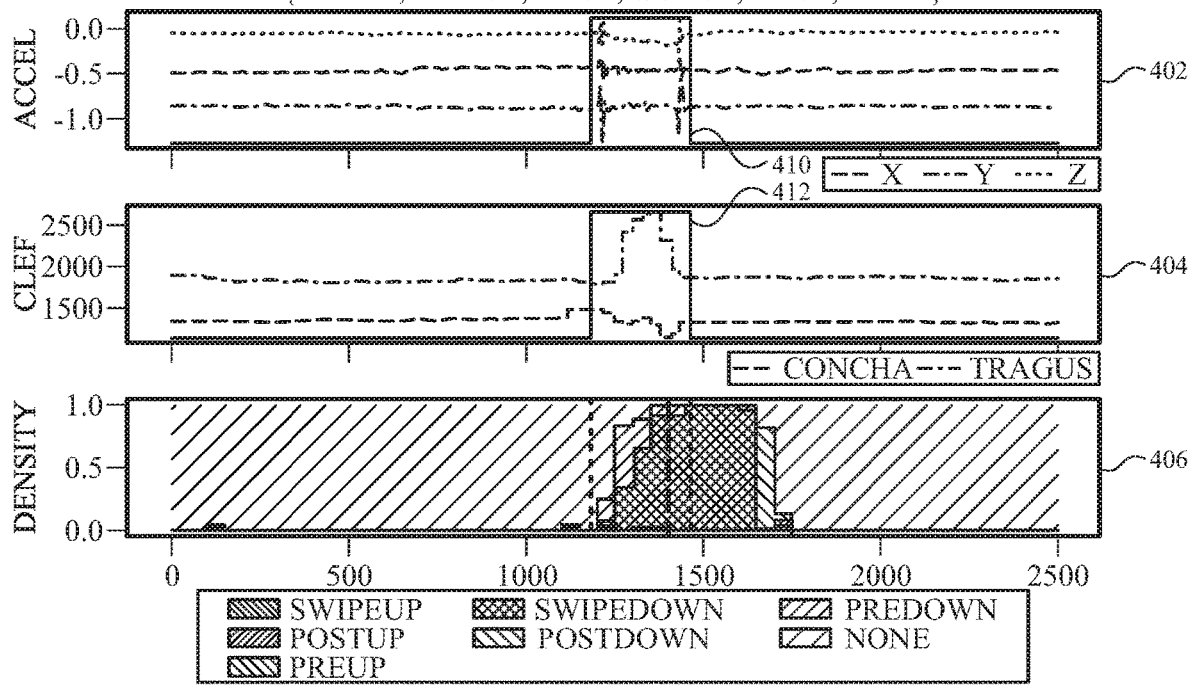
FIGS. 4A-4B illustrate example timing diagrams of sensor outputs from the wireless audio output device that may indicate respective gestures in accordance with one or more implementations.
Figure 4B:
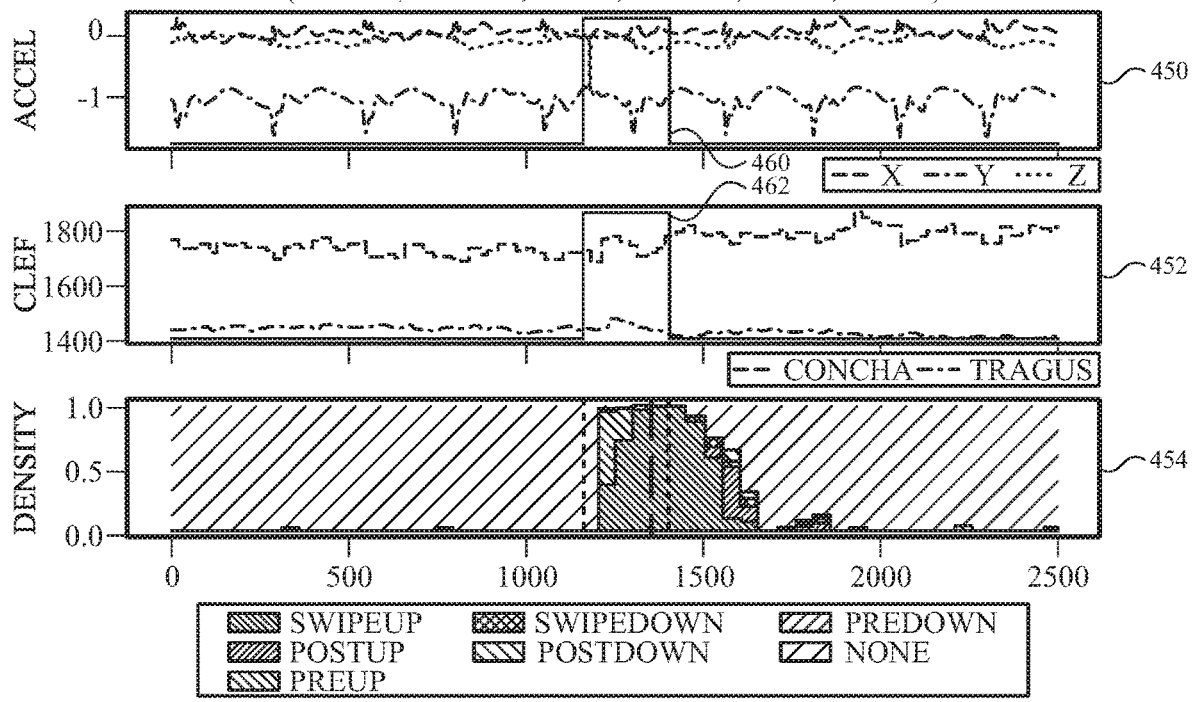

FIGS. 4A-4B illustrate example timing diagrams of sensor outputs from the wireless audio output device 104 that may be indicative of respective touch gestures in accordance with one or more implementations.

As shown in FIGS. 4A-4B, graph 402 and graph 450 include respective timing diagrams of sensor output data from respective motions sensors of the wireless audio output device 104. The x-axis of graph 402 and graph 450 corresponds to values of motion from the accelerometers or other motion sensors, and the y-axis of graph 402 and graph 450 corresponds to time.

As also shown, graph 404 and graph 452 include respective timing diagrams of optical sensors of the wireless audio output device 104. The x-axis of graph 404 and graph 452 corresponds to values of light luminosity from the optical sensors (e.g., an amount of light reflected from the user's skin), and the y-axis of graph 402 and graph 450 corresponds to time. Segment 410 and segment 412 correspond to a period of time where particular gestures are occurring based on the sensor output data shown in graph 402 and graph 404. Similarly, segment 460 and segment 462 correspond to a period of time where particular gestures are occurring based on the sensor output data shown in graph 450 and graph 452.

Respective predictions of the machine learning model 304 are shown in graph 406 and graph 454. In an implementation, the machine learning model 304 provides ten predictions per second (or some other amount of predictions) based on the aforementioned sensor output data which is visually shown in graph 406 and graph 454. The machine learning model 304 provides a prediction output that falls into one of seven different categories: no data ("none" or no gesture), the beginning of a swipe up ("Pre-Up"), the middle of the swipe up ("Swipe Up"), or the end of the swipe up ("Post-Up"), beginning of a swipe down ("Pre-Down"), the middle of the swipe down ("Swipe Down"), or the end of the swipe down ("Post-Down").

The different categories of predicted gestures enables more robustness to boundary conditions so that the machine learning model 304 does not need to provide a "hard" classification between none and up, and consequently there is a transitionary period where sensor output data can go between gesture stages corresponding to none (e.g., no gesture), pre-up, swipe up and then post-up before falling back down to none. In graph 406 and graph 454, the x-axis indicates a number of frames where each frame may correspond to individual data points. In an example, a number of frames (e.g., 125 frames) can be utilized for each prediction provided by the machine learning model 304.

In an implementation, as mentioned before, the machine learning model 304 also further utilizes a policy to determine a prediction output. As referred to herein, a policy can correspond to a function that determines a mapping of a particular input (e.g., sensor output data) to a corresponding action (e.g., providing a respective prediction). In an example, the machine learning model 304 only utilizes sensor output data corresponding to either a swipe up or a swipe down to make a classification, and the policy can determine an average of a number of previous predictions (e.g., 5 previous predictions). The machine learning model 304 takes the previous predictions over a certain window of time, and when the average of these predictions exceeds a particular threshold, the machine learning model 304 can indicate a particular action (e.g., adjusting the volume of the speaker 214) for the wireless audio output device 104 to initiate. In one or more implementations, a state machine may be utilized to further refine the predictions, e.g. based on previous predictions over a window of time.

In an implementation, for a pair of wireless audio output devices, such as a pair of earbuds, a respective machine learning model can run independently on each of the pair of wireless audio output devices. The pair of wireless audio output devices can communicate between each other to determine whether both of the wireless audio output devices detected a swipe gesture around the same time. If both wireless audio output devices detect a swipe gesture around the same time, whether the swipe gesture is in the same direction or opposite directions, the policy can determine to suppress the detection of the swipe gestures to help prevent detecting different direction swipes on both wireless audio output devices, or having a false trigger that is not due to touch input on one of the wireless audio output devices but instead a general motion (e.g., one not corresponding to a particular action for the wireless audio output device to take).

Figure 5:
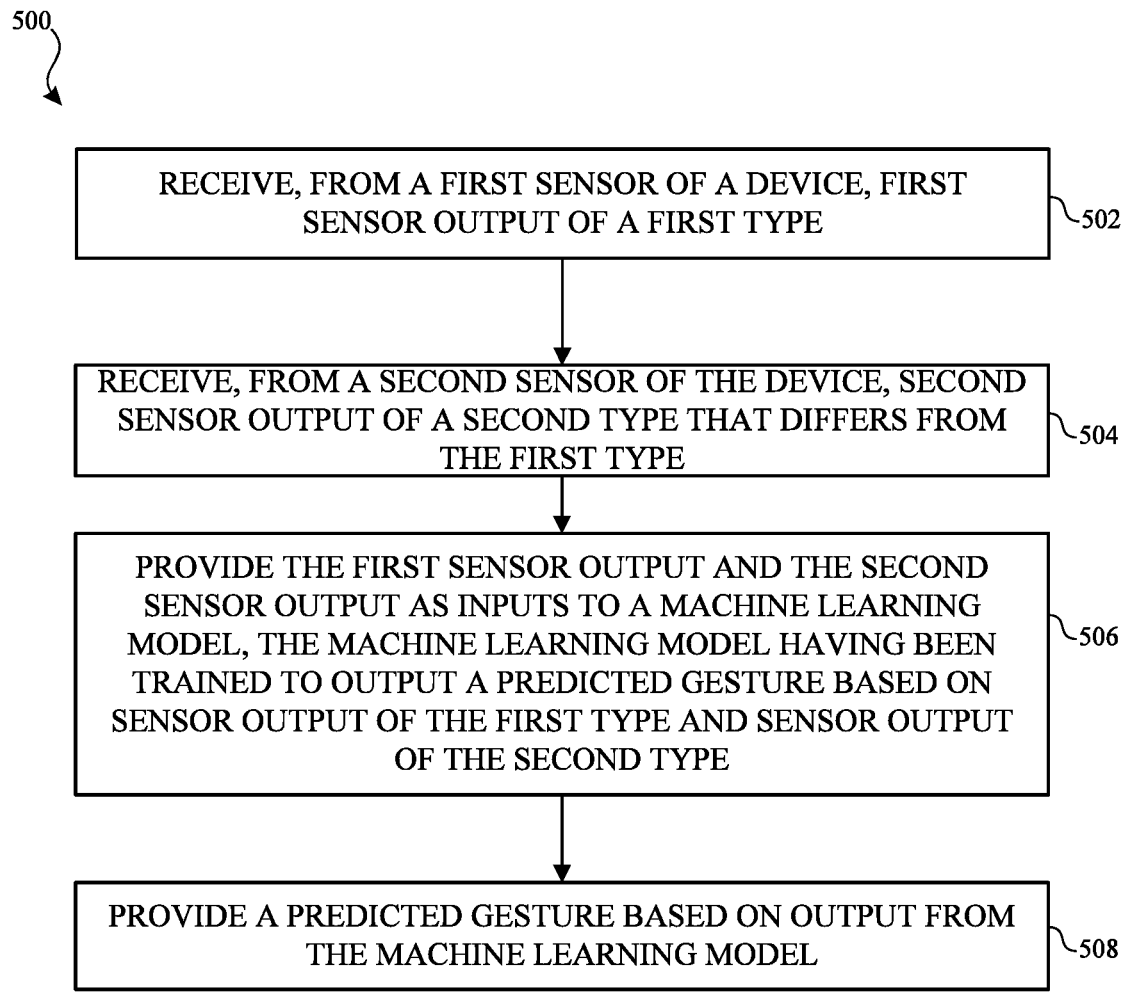
FIG. 5 illustrates a flow diagram of example process for machine-learning based gesture recognition in accordance with one or more implementations.

FIG. 5 illustrates a flow diagram of example process for machine-learning based gesture recognition in accordance with one or more implementations. For explanatory purposes, the process 500 is primarily described herein with reference to the wireless audio output device 104 of FIG. 1. However, the process 500 is not limited to the wireless audio output device 104 of FIG. 1, and one or more blocks (or operations) of the process 500 may be performed by one or more other components and other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The wireless audio output device 104 receives, from a first sensor (e.g., one of the sensor(s) 210), first sensor output of a first type (502). The wireless audio output device 104 receives, from a second sensor (e.g., another one of the sensor(s) 210), second sensor output of a second type (504).

The wireless audio output device 104 provides the first sensor output and the second sensor output as inputs to a machine learning model, the machine learning model having been trained to output a predicted gesture based on sensor output of the first type and sensor output of the second type (506).

The wireless audio output device 104 provides a predicted gesture based on output from the machine learning model (508). The first sensor and the second sensor may be non-touch sensors in an implementation. In one or more implementations, the first sensor and/or the second sensor may include an accelerometer, a microphone or an optical sensor. The first sensor output and the second sensor output may correspond to sensor input detected from a touch gesture provided by a user with respect to wireless audio output device 104, such as a tap, a swipe up, a swipe down, and the like. In an implementation, the predicted gesture includes at least one of: a start swipe up, a middle swipe up, an end swipe up, a start swipe down, a middle swipe down, an end swipe down or a non-swipe. Respective sensor inputs for each of the aforementioned gestures may be different inputs. For example, sensor inputs for a start swipe down or a start swipe up can correspond to accelerometer inputs indicating acceleration or movement in first direction or a second direction, respectively, and/or whether sensor inputs are received at a particular optical sensor located on the wireless audio output device 104 (e.g., where the wireless audio output device 104 includes at least two optical sensors) and/or sensor inputs at a particular microphone (e.g., where the wireless audio output device 104 may include one or more microphones). In another example, sensor inputs for an end swipe up or an end swipe down correspond to accelerometer inputs indicating acceleration or movement has ended and/or sensor inputs to a second particular microphone and/or whether sensor inputs are received at a particular optical sensor located on the wireless audio output device 104.

An output level, e.g., an audio output level or volume, of wireless audio output device 104 can be adjusted at least based on the predicted gesture. In an example, sensor inputs corresponding to a swipe down gesture can be determined based a combination of predicted gestures including a start swipe down, a middle swipe down, and an end swipe down. Further, the swipe down gesture can be predicted based on the particular order of aforementioned predicted gestures such as where the start swipe down is predicted first, the middle swipe down is predicted second, and finally the end swipe down is predicted third. The system then determines a particular action for the wireless audio output device 104 based on the predicted gesture such as adjusting the audio output level of the wireless audio output device 104.

In an example, sensor input corresponding to a middle swipe up or a middle swipe results in a respective predicted gesture for performing an action that increases or decreases an audio output level of the wireless audio output device 104. In an example, the predicted gesture is based on at least in part on the middle swipe up or the middle swipe down, and adjusting the audio output level includes increasing or decreasing the audio output level of the audio output device by a particular increment.

In another example, a combination of various gestures and/or a particular order of the combination of gestures can correspond to a particular action that is based on a continuous gesture (i.e., control that is proportional to the distance traveled by the finger). In an example, adjusting the audio output level is based at least in part on 1) a first distance based on the start swipe up, the middle swipe up, and the end swipe up, or 2) a second distance based on the start swipe down, the middle swipe down, and the end swipe down. In this example, adjusting the audio output level includes increasing or decreasing the audio output level of the audio output device 104 in proportion to the first distance or the second distance.

As described above, one aspect of the present technology is the gathering and use of data available from specific and legitimate sources for providing user information in association with messaging. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing information corresponding to a user in association with messaging. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing information corresponding to a user in association with messaging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 6:
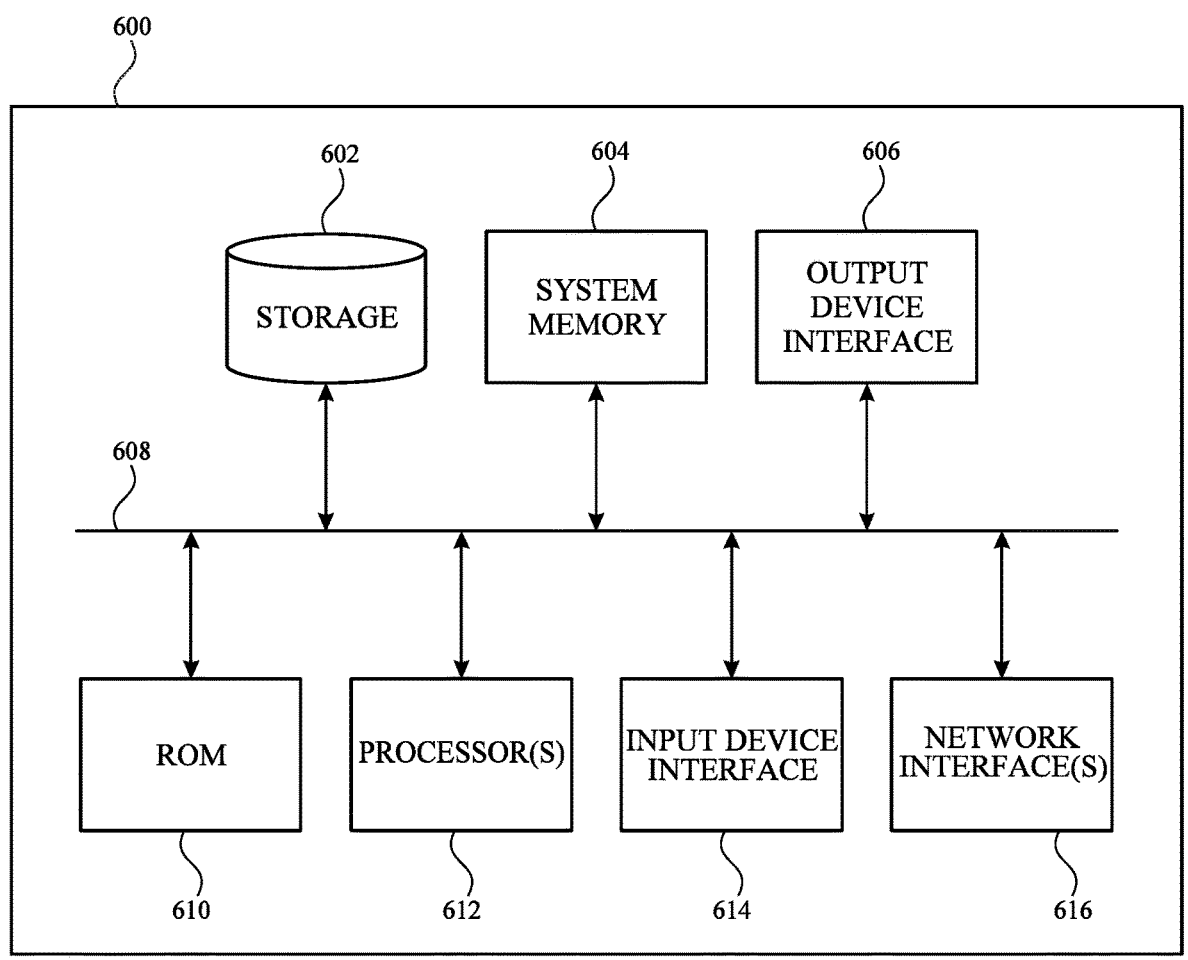
FIG. 6 illustrates an example electronic system with which aspects of the subject technology may be implemented in accordance with one or more implementations.

FIG. 6 illustrates an electronic system 600 with which one or more implementations of the subject technology may be implemented. The electronic system 600 can be, and/or can be a part of, one or more of the electronic devices 102-106, and/or one or the server 108 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the server 108 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving, from a first non-touch sensor of a device, first sensor output of a first type;
receiving, from a second non-touch sensor of the device, second sensor output of a second type that differs from the first type;
providing the first sensor output and the second sensor output as concurrent inputs to a machine learning model, the machine learning model having been previously trained to output a predicted gesture based on both sensor output of the first type and sensor output of the second type;
providing a predicted gesture on a surface of the device based on an output from the machine learning model, the output generated in response to the providing of both the first sensor output and the second sensor output as concurrent inputs to the machine learning model; and
adjusting an audio output level of the device based on the predicted gesture on the surface of the device, wherein the device comprises an audio output device.

2. The method of claim 1, wherein the first non-touch sensor and the second non-touch sensor do not include touch sensors and the predicted gesture comprises a predicted touch-based gesture on the surface of the device.

3. The method of claim 2, wherein each of the first non-touch sensor and the second non-touch sensor comprises at least one of an accelerometer, a microphone or an optical sensor.

4. The method of claim 1, wherein the first sensor output and the second sensor output correspond to sensor input detected from a gesture provided by a user with respect to the device, wherein the gesture provided by the user is a touch-based gesture on the surface of the device.

5. The method of claim 1, wherein an action is performed when a particular prediction is received a particular number of times.

6. The method of claim 1,
wherein the machine learning model has been trained to predict, based on the sensor output of the first type and the sensor output of the second type: a start swipe up, a middle swipe up, an end swipe up, a start swipe down, a middle swipe down, an end swipe down, and a non-swipe, and
wherein the predicted gesture comprises at least one of the start swipe up, the middle swipe up, the end swipe up, the start swipe down, the middle swipe down, or the end swipe down.

7. The method of claim 6, wherein the predicted gesture is based on a combination of multiple predictions from the machine learning model, the multiple predictions including at least the middle swipe up or the middle swipe down, and wherein adjusting the audio output level includes increasing or decreasing the audio output level of the audio output device by a particular increment,
or wherein adjusting the audio output level is based at least in part on a first distance based on the start swipe up, the middle swipe up, and the end swipe up, or a second distance based on the start swipe down, the middle swipe down, and the end swipe down, and adjusting the audio output level includes increasing or decreasing the audio output level of the audio output device in proportion to the first distance or the second distance.

8. A device, comprising:
a sensor;
at least one processor; and
a memory including instructions that, when executed by the at least one processor, cause the at least one processor to:
receive sensor output of a predefined type from the sensor, the sensor being a non-touch sensor;
provide the sensor output to a machine learning model, the machine learning model having been previously trained to output a predicted touch-based gesture based on prior sensor output of the predefined type;
provide a predicted gesture on a surface of the device based on an output from the machine learning model, the output generated in response to providing the sensor output to the machine learning model; and adjust an audio output level of the device based on the predicted gesture.

9. The device of claim 8, wherein the sensor comprises at least one of: an accelerometer, a microphone or an optical sensor.

10. The device of claim 8, wherein the sensor output corresponds to a gesture provided by a user on the surface of the device.

11. The device of claim 10, wherein the gesture provided by the user is a touch-based gesture on the surface of the device that corresponds to the predicted gesture.

12. The device of claim 8, wherein the predicted gesture comprises at least one of: a start swipe up, a middle swipe up, an end swipe up, a start swipe down, a middle swipe down, an end swipe down or a non-swipe.

13. The device of claim 12, wherein the predicted gesture is based on at least in part on the middle swipe up or the middle swipe down, and adjusting the audio output level includes increasing or decreasing the audio output level by a particular increment,
or wherein to adjust the audio output level is based at least in part on a first distance based on the start swipe up, the middle swipe up, and the end swipe up, or a second distance based on the start swipe down, the middle swipe down, and the end swipe down, and to adjust the audio output level includes increasing or decreasing the audio output level in proportion to the first distance or the second distance.

14. The device of claim 8, the device further comprising a second sensor, the instructions further causing the at least one processor to:
receive second sensor output of a second predefined type from the second sensor, the second sensor being a non-touch sensor; and
provide the second sensor output in conjunction with the sensor output to the machine learning model, the machine learning model having been trained to output the predicted gesture based on prior sensor output of the predefined type and of the second predefined type.

15. A computer program product comprising code, stored in a non-transitory computer-readable storage medium, the code comprising:
code to receive, from a first non-touch sensor of a device, first sensor output of a first type in association with a gesture provided by a user with respect to the device;
code to receive, from a second non-touch sensor of the device, second sensor output of a second type in association with the gesture provided by the user;
code to provide the first sensor output and the second sensor output as concurrent inputs to a machine learning model, the machine learning model having been previously trained to output a predicted gesture based on both sensor output of the first type and sensor output of the second type;
code to provide a predicted gesture on a surface of the device based on an output from the machine learning model, the output generated in response to the providing of both the first sensor output and the second sensor output as concurrent inputs to the machine learning model; and
code to adjust an audio output level of the device based on the predicted gesture on the surface of the device.

16. The computer program product of claim 15, wherein the first non-touch sensor and the second non-touch sensor do not include touch sensors and the predicted gesture comprises a predicted touch-based gesture.

17. The computer program product of claim 16, wherein each of the first non-touch sensor and the second non-touch sensor comprises an accelerometer, a microphone or an optical sensor.

18. The computer program product of claim 15, wherein the gesture provided by the user is a touch-based gesture.

19. The computer program product of claim 15, wherein the predicted gesture comprises at least one of: a start swipe up, a middle swipe up, an end swipe up, a start swipe down, a middle swipe down, an end swipe down or a non-swipe.

20. The computer program product of claim 19, wherein the predicted gesture is based on at least in part on the middle swipe up or the middle swipe down, and to adjust the audio output level includes increasing or decreasing the audio output level by a particular increment,
or wherein to adjust the audio output level is based at least in part on a first distance based on the start swipe up, the middle swipe up, and the end swipe up, or a second distance based on the start swipe down, the middle swipe down, and the end swipe down, and to adjust the audio output level includes increasing or decreasing the audio output level in proportion to the first distance or the second distance.

* * * * *